(12) United States Patent
Valentin

(10) Patent No.: US 8,898,143 B2
(45) Date of Patent: Nov. 25, 2014

(54) DATABASE COMPARISON SYSTEM AND METHOD

(71) Applicant: Marco Valentin, Malsch (DE)

(72) Inventor: Marco Valentin, Malsch (DE)

(73) Assignee: SAP SE, Walldorf (DE)

( * ) Notice: Subject to any disclaimer, the term of this patent is extended or adjusted under 35 U.S.C. 154(b) by 89 days.

(21) Appl. No.: 13/630,662

(22) Filed: Sep. 28, 2012

(65) Prior Publication Data

US 2014/0095476 A1    Apr. 3, 2014

(51) Int. Cl.
*G06F 17/30* (2006.01)

(52) U.S. Cl.
CPC .... *G06F 17/30442* (2013.01); *G06F 17/30448* (2013.01)
USPC .......................................... 707/713; 707/719

(58) Field of Classification Search
CPC .................. G06F 17/30424; G06F 17/30427; G06F 17/30433; G06F 17/30442; G06F 17/30448; G06F 17/30451; G06F 17/30463; G06F 17/30471
USPC .................. 707/706, 713, 718, 719, 760, 761
See application file for complete search history.

(56) References Cited

U.S. PATENT DOCUMENTS

| | | | | |
|---|---|---|---|---|
| 5,812,840 | A * | 9/1998 | Shwartz | 1/1 |
| 6,546,381 | B1 * | 4/2003 | Subramanian et al. | 1/1 |
| 6,718,320 | B1 * | 4/2004 | Subramanian et al. | 707/719 |
| 7,228,312 | B2 * | 6/2007 | Chaudhuri et al. | 1/1 |
| 7,451,136 | B2 * | 11/2008 | Chua et al. | 1/1 |
| 7,991,783 | B2 * | 8/2011 | Flynn et al. | 707/759 |
| 8,171,018 | B2 * | 5/2012 | Zane et al. | 707/718 |
| 8,321,337 | B2 * | 11/2012 | Fenlon et al. | 705/39 |
| 8,543,590 | B2 * | 9/2013 | McLoughlin et al. | 707/760 |
| 2003/0126114 | A1 * | 7/2003 | Tedesco | 707/3 |
| 2004/0111698 | A1 * | 6/2004 | Soong et al. | 717/102 |
| 2005/0240569 | A1 * | 10/2005 | Cheng et al. | 707/3 |
| 2006/0020573 | A1 * | 1/2006 | Galindo-Legaria et al. | 707/1 |
| 2006/0200753 | A1 * | 9/2006 | Bhatia et al. | 715/505 |
| 2006/0206903 | A1 * | 9/2006 | Lawrence et al. | 719/313 |
| 2007/0130206 | A1 * | 6/2007 | Zhou et al. | 707/104.1 |
| 2007/0192265 | A1 * | 8/2007 | Chopin et al. | 706/20 |
| 2008/0307055 | A1 * | 12/2008 | Waters | 709/206 |
| 2010/0138454 | A1 | 6/2010 | Volkmer | |
| 2010/0191720 | A1 * | 7/2010 | Al-Omari et al. | 707/718 |
| 2011/0106811 | A1 * | 5/2011 | Novoselsky et al. | 707/741 |
| 2011/0231389 | A1 * | 9/2011 | Surna et al. | 707/718 |
| 2011/0282864 | A1 * | 11/2011 | Collins et al. | 707/719 |
| 2012/0150902 | A1 * | 6/2012 | Midgley | 707/769 |
| 2012/0173515 | A1 * | 7/2012 | Jeong et al. | 707/718 |
| 2013/0006968 | A1 * | 1/2013 | Gusmini et al. | 707/722 |

* cited by examiner

*Primary Examiner* — Cam-Linh Nguyen

(74) *Attorney, Agent, or Firm* — Schwegman Lundberg & Woessner, P.A.

(57) ABSTRACT

A system and method include receiving a request for data at a programmed computer, the request identifying a field and an operation for an embedded database, translating the request via the programmed computer into multiple requests tailored to schemas of multiple different databases, estimating a cost to execute the request against each of the multiple different databases, and identifying the database that can execute the request with the least cost.

20 Claims, 3 Drawing Sheets

DATABASE COMPARISON SYSTEM AND METHOD

BACKGROUND

Enterprise resource planning (ERP) systems are designed with a database to store information related to an enterprise. The particular database used may vary between different ERP systems, and may store the data in different ways. The organization of each database is defined by schema, which is used to determine how to retrieve data to perform transactions, such as reports and queries. Some transactions may also specify processing of the data to obtain a result, such as the sum of all sales for a particular area during a particular time frame. Each of the values in the database that meet the criteria of area and time frame are added together to form an aggregated value. Different aggregations may be requested in different transactions. Some ERP system databases may have a schema designed to efficiently perform an expected set of transactions. Unexpected transactions, or poorly designed databases, may result in inefficient, high cost processing of transactions.

SUMMARY

A system and method include receiving a request for data at a programmed computer, the request identifying a field and an operation for an embedded database, translating the request via the programmed computer into multiple requests tailored to schemas of multiple different databases, estimating a cost to execute the request against each of the multiple different databases, and identifying, the database that can execute the request with the least cost.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor. ASIC, microprocessor, or other type of processor operating on a computer system, such as a personal computer, server or other computer system.

A system and method provide estimates for transactions that can be run against multiple databases to find the database having the lowest cost. A request is received for data. The request identifies a field and an operation for an embedded database. The request is translated into multiple requests tailored to schemas of multiple different databases. A cost is estimated for executing the request against each of the multiple different databases. The database that can execute the request with the least cost is identified.

Figure 1:
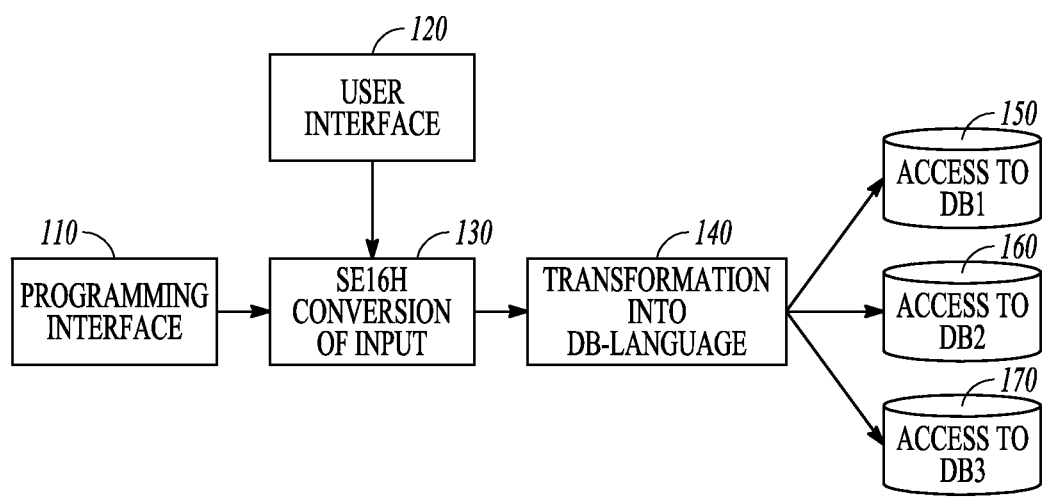
FIG. 1 is a block diagram illustrating an architecture for determining costs of transactions for multiple databases according to an example embodiment.

FIG. 1 is a block diagram of a system 100 to determine access times for a transaction, such as a query or report to be run. A programming interface 110 is provided to enable programmers to provide code or performing, many different functions. At 120, a user interface is provided to allow the user to specify transactions, identify databases to test for cost, and to select a database to perform the transaction. At 130, the transaction is received and is analyzed, checked, and converted from internal structures to a standardized structure that is a prerequisite that the transaction can be understood by any database system, such as for example SAP HANA.

At 140, the transaction is then converted into different requests suitable for multiple different databases 150, 150, and 170, which may store the data in different forms, such as for example, tables, indices, flat files, rows and columns, etc. Each database tray have a different schema defining how the data is stored and accessed, resulting in different requests being generated for each different database. Still further, each database may optimize the request based on their schemas to optimize performance of the request. In one embodiment, a transaction may be user generated, or selected from multiple available transactions created by users or by programmers. The cost of using many different databases can be determined while hiding the differences to a user and providing the user with a single interface, for example, a Se16H interface.

Figure 2:
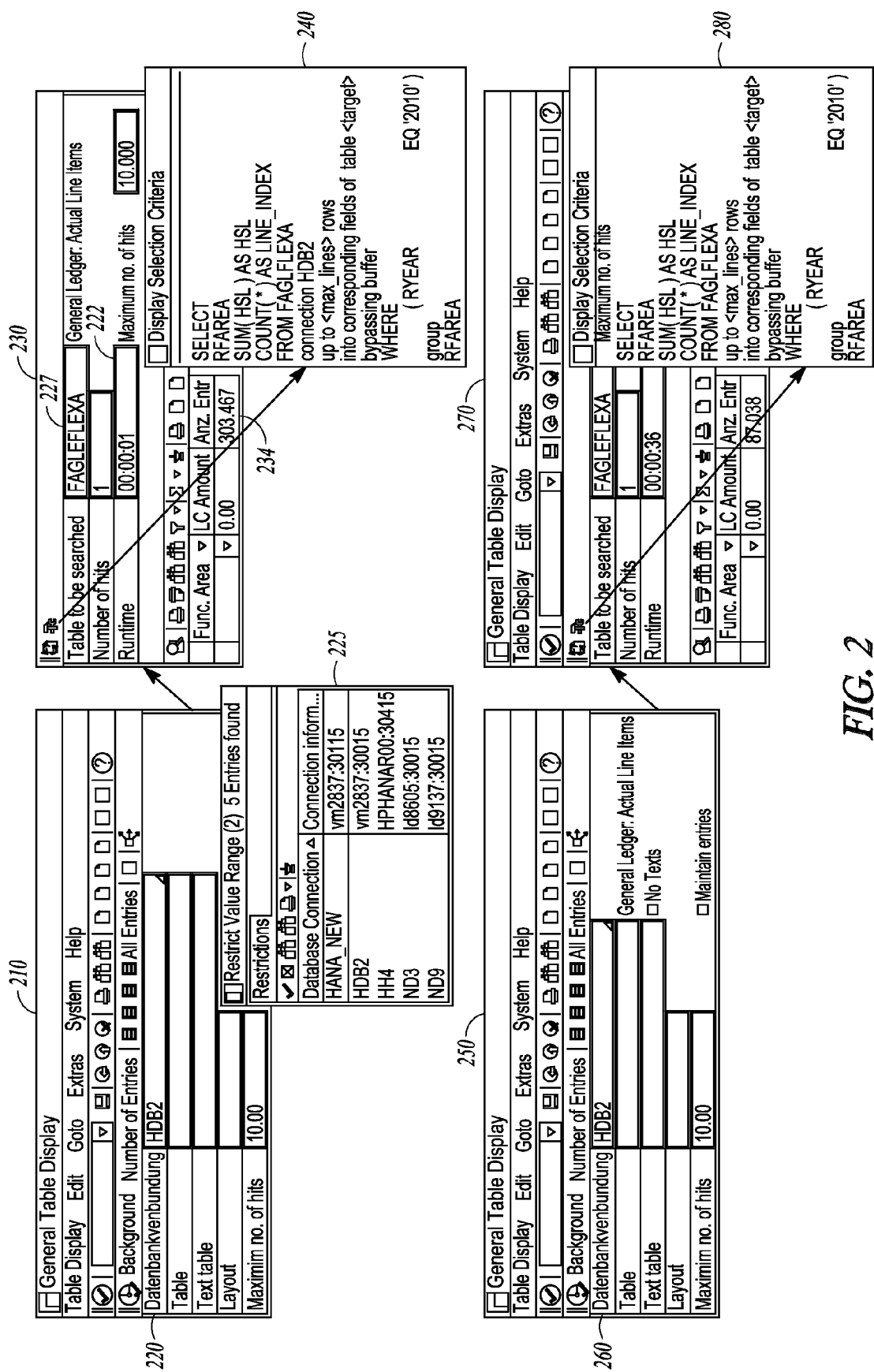
FIG. 2 is a diagram illustrating interfaces for determining costs of transactions for multiple databases according to an example embodiment.

FIG. 2 is a diagram illustrating multiple screens of an example user interface 200. A screen 210 illustrates an interaction with a data selection function. Se16H, called in an embedded ERP system, such as HANA. At screen 220, a user is able to select database connections (labeled Datenbankvenbundung in FIG. 2) which may be replications of the embedded ERP database for testing the cost of a selected transaction via an embedded value help 225, which lists databases alone, with connection information to facilitate access to the corresponding databases. Five different connections are shown in this example, HANA_NEW, HDB2, HH4, ND3, and ND9. Access criteria may be defined based on business needs. The access criteria may represent a selected report to be run, a query, or some other request that requires access to data and optionally, aggregations of the data. The access criteria may also be defined via a query language such as structured query language (SQL). At 227, a table name (example name=FAGLFLEXA) is identified from which to obtain data to respond to the request. A maximum number of hits may also be specified, in this case, 10,000.

A result screen 230 shows the result and a cost or run time for the transaction for each database selected. The run time in this example is estimated to be 1 second at 222. The number of lines searched is 303,467 as indicated at 234. Since this is an embedded database with pre-aggregated information, the run time is very short for this particular request. At 240, the transaction interface also displays the access data technically, as a select statement, so that a user can create further access requests for specific databases. The select statement indicates the table, and connection to be used to obtain the data responsive to the request.

At 250, without having to do anything other than obtaining connections to various databases, the same test is done for each such database that is identified by a user at 260. The result for at least one additional database is shown at 270. Each database access will show the runtime (36 seconds in this example over 87,038 lines) and technical statement 280 to allow a user to make an informed decision on the database to use for performing the transaction, referred to as reporting. In this particular example, it is much quicker to perform the transaction via the database as illustrated at 220, 230 than the one illustrated at 260, 270. In addition, the number of lines is different, which means that the database underlying the access information at 260 is not on to date, as it has significantly fewer lines. The time difference would be even greater if the information at 260 included ail the lines it should.

In one embodiment, the system 100 utilizes an embedded database. In an embedded database, the data is stored on semiconductor based memory, which generally has a much faster access time than data that is stored in rotating type of storage, such as disk drives, optical disk drives or other slower forms of storage. In one embedded database, data may be aggregated as the database is updated. Values in columns or rows of the database are added or otherwise processed to form an aggregated value based on the values in a column or row. Aggregation may be performed for different partitions or other logical arrangements of the database. In some embodiments, these aggregations may correspond to aggregations in transactions, further reducing the cost of using the embedded database. The aggregations may be simple addition of values, or more complex functions may be performed on the values.

Figure 3:
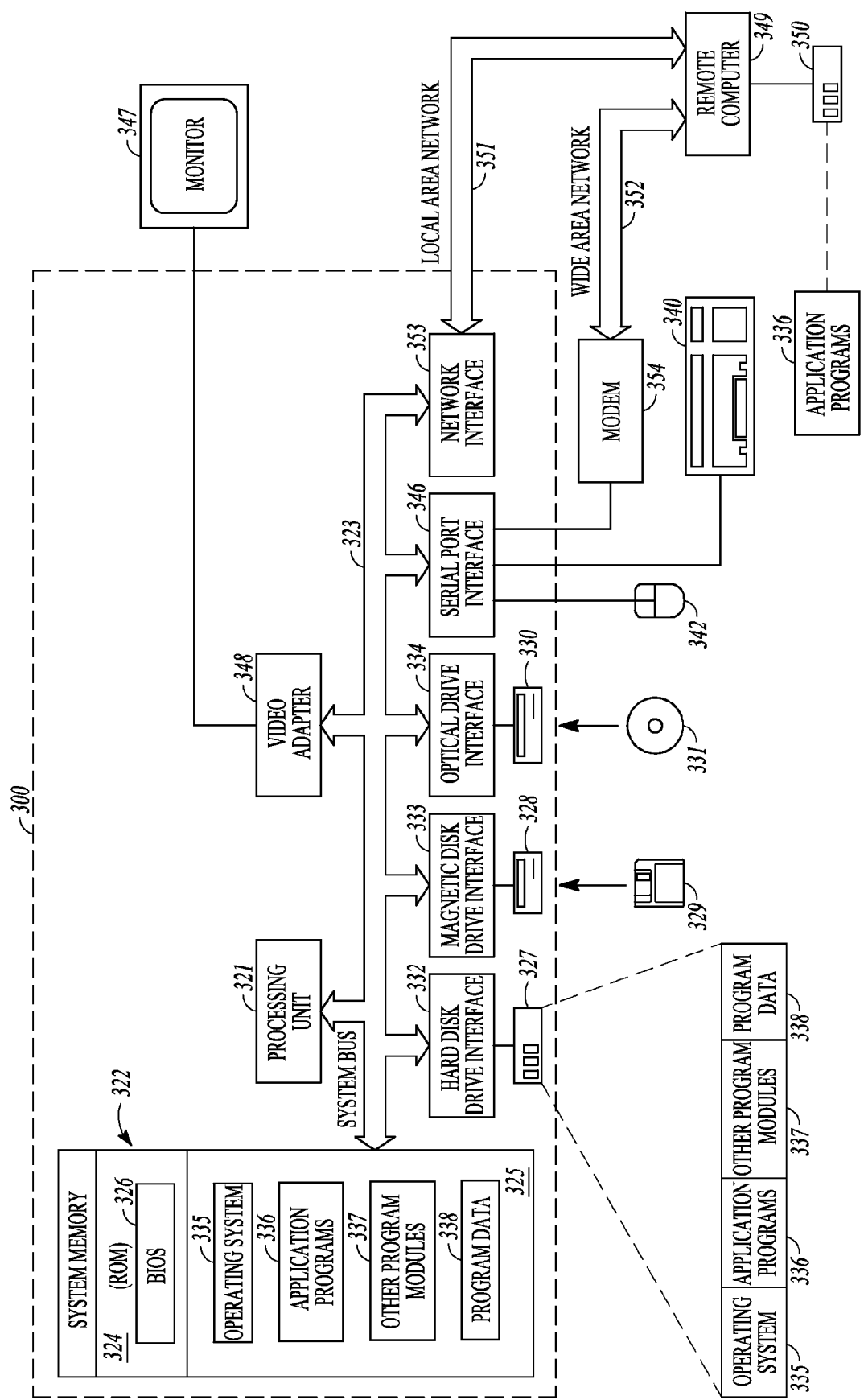
FIG. 3 is a block diagram of an example programmed computer system for performing functions according to an example embodiment.

FIG. 3 is a block diagram of a computer system to implement methods according to an example embodiment. In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 300 (e.g., a personal computer, workstation, or server), including one or more processing, units 321, a system memory 322, and a system bus 323 that operatively couples various system components including the system memory 322 to the processing unit 321. There may be only one or there may be more than one processing unit 321, such that the processor of computer 300 comprises a single central-processing unit (CPU), or a plurality of processing units, commonly referred to as a multiprocessor or parallel-processor environment. In various embodiments computer 300 is a conventional computer, a distributed computer, or any other type of computer.

The system bus 323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 324 and random-access memory (RAM) 125. A basic input/output system (BIOS) program 326, containing the basic routines that help to transfer information between elements within the computer 300, such as during start-up, may be stored in ROM 324. The computer 300 further includes a had disk drive 327 for reading from and writing to a hard disk, not shown, a magnetic disk drive 328 for reading from or writing to a removable magnetic disk 329, and an optical disk drive 330 for reading from or writing to a removable, optical disk 331 such as a CD ROM or other optical media.

The hard disk drive 327, magnetic disk drive 328, and optical disk drive 330 couple with a hard disk drive interface 332, a magnetic disk drive interface 333, and an optical disk drive interface 334, respectively. The drives and their associated computer-readable media provide non volatile storage of computer-readable instructions, data structures, program modules and other data for the computer 300. It should be appreciated by those skilled in the art that any type of computer-readable media which can store data that is accessible by a computer, such as magnetic cassettes, flash memory cards, digital video disks. Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 329, optical disk 331, ROM 324 or RAM 325, including an operating system 335, one or mere application programs 336, other program modules 337, and program data 338. Programming for implementing one or more processes or method described herein may be resident on any one or number of these computer-readable media.

A user may enter commands and information into computer 300 through input devices such as a keyboard 340 and pointing device 342. Other input devices knot shown) can include a microphone, joystick, game pad, satellite dish, scanner, or the like. These other input devices are often connected to the processing unit 321 through a serial port interface 346 that is coupled to the system bus 323, but can be connected by other interfaces, such as a parallel port, game port, or a universal serial bus (USB). A monitor 347 or other type or display device can also be connected, to the system bus 323 via an interface, such as a video adapter 348. The monitor 347 can display a graphical user interface for the user. In addition to the monitor 347, computers typically include other peripheral output devices (not shown), such as speakers and printers.

The computer 300 may operate in a networked environment using logical connections to one or more remote computers or servers, such as remote computer 349. These logical connections are achieved by a communication device coupled to or a part of the computer 300; other types of communication devices may also be used. The remote computer 349 can be another computer, a server, a router, a network PC, a client, a peer device or other common network node, and typically includes many or all of the elements described above I/O relative to the computer 300 although only a memory storage device 350 has been illustrated. The logical connections depicted in FIG. 3 include a local area network (LAN) 351 and/or a wide area network (WAN) 352. Such networking environments are commonplace in office networks, enterprise-wide computer networks, intranets and the internet, which are all types of networks.

When used in a LAN-networking environment, the computer 300 is connected to the LAN 351 through a network interface or adapter 353, which is one type of communications device. In some embodiments, when used in a WLAN-networking environment, the computer 300 typically includes a modem 354 (another type of communications device) or any other type of communications device, e.g., a wireless transceiver, for establishing communications over the wide area network 352, such as the internet. The modem 354, which may be internal or external, is connected to the system bus 323 via the serial port interface 346. In a networked environment, program modules depicted relative to the computer 300 can be stored in the remote memory storage device 350 of remote computer, or server 349. It is appreciated that the network connections shown are exemplary and other means of and communications devices for, establishing a communications link between the computers may be used including hybrid fiber-coax connections, T1-T3 lines, DSL's, OC-3 and/or OC-12. TCP/IP, microwave, wireless application protocol, and any other electronic media through any suitable switches, routers, outlets and power lines, as the same are known and understood by one of ordinary skill in the art.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   receiving a transaction request for data at a programmed computer, the transaction request identifying a field and an operation for an embedded database to obtain a transaction result, including forming an aggregated value;
   converting the transaction request having embedded database internal structures into a request having a standardized structure that can be understood by multiple different databases, wherein the embedded database is an in memory database;
   translating the request via the programmed computer into multiple requests tailored to schemas of multiple different databases;
   identifying connections to the multiple different databases;
   estimating a cost to execute the request against each of the multiple different databases; and
   identifying the database that can execute the request with the least cost.

2. The method of claim 1 wherein estimating a cost is performed by a database server for each corresponding different database.

3. The method of claim 1 wherein the databases includes data for an enterprise resource planning system.

4. The method of claim 1 and further comprising displaying a database specific select statement for each database corresponding to the request and display a number of hits for each select statement in each database.

5. The method of claim 1 and further comprising displaying a number of hits and runtime estimate for each of the multiple different databases.

6. The method of claim 5 wherein the in memory database comprises columns including an aggregation for each column.

7. The method of claim 5 wherein the in memory database comprises a random access memory semiconductor based in memory database.

8. The method of claim 1 wherein the cost for each database is optimized for the corresponding database.

9. A computer readable storage device having instructions stored thereon for causing a computer to perform a method, the method comprising:
   receiving a transaction request for data at a programmed computer, the transaction request identifying a field and an operation for an embedded database to obtain a transaction result, including forming an aggregated value;
   converting the transaction request having embedded database internal structures into a request having a standardized structure that can be understood by multiple different databases;
   translating the request via the programmed computer into multiple requests tailored to schemas of multiple different databases;
   identifying connections to the multiple different databases;
   estimating a cost to execute the request against each of the multiple different databases; and
   identifying the database that can execute the request with the least cost.

10. The computer readable storage device of claim 9 wherein estimating a cost is performed by a database server for each corresponding different database.

11. The computer readable storage device of claim 9 wherein the databases includes data for an enterprise resource planning system.

12. The computer readable storage device of claim 9 wherein the method further comprises displaying a database specific select statement for each database corresponding to the request.

13. The computer readable storage device of claim 9 wherein the embedded database comprises an in memory database.

14. The computer readable storage device of claim 13 wherein the in memory database comprises columns including an aggregation for each column.

15. The computer readable storage device of claim 13 wherein the in memory database comprises a random access memory semiconductor based in memory database.

16. The computer readable storage device of claim 9 wherein the cost for each database is optimized for the corresponding database.

17. A system comprising:
   a user interface generator to receive a request for data, the request identifying a field and an operation for an embedded database to obtain a transaction result, including forming an aggregated value;
   a module to convert the transaction request having embedded database internal structures into a request having a standardized structure that can be understood by multiple different databases;
   a translator to translate the request via the programmed computer into multiple requests tailored to schemas of multiple different databases;
   a module to identify connections to the multiple different databases; and
   an estimator to determine a cost to execute the request against each of the multiple different databases and identify the database that can execute the request with the least cost.

18. The system of claim 17 wherein the databases includes data for an enterprise resource planning system.

19. The system of claim 17 and further comprising a driver to display a database specific select statement for each database corresponding to the request along with the corresponding cost as an execution time.

20. The system of claim 9 wherein the embedded database comprises an in memory database with dynamically calculated aggregations.

* * * * *